(12) United States Patent
Fujimoto et al.

(10) Patent No.: US 8,524,788 B2
(45) Date of Patent: Sep. 3, 2013

(54) CATALYST FOR PRODUCING HYDROCARBON FROM SYNGAS AND PRODUCING METHOD OF CATALYST

(75) Inventors: Kenichiro Fujimoto, Chiba (JP); Kimihito Suzuki, Tokyo (JP); Shouli Sun, Tokyo (JP)

(73) Assignees: Nippon Steel & Sumitomo Metal Corporation, Tokyo (JP); Japan Oil, Gas and Metals National Corporation, Kanagawa (JP)

( * ) Notice: Subject to any disclaimer, the term of this patent is extended or adjusted under 35 U.S.C. 154(b) by 0 days.

(21) Appl. No.: 13/445,484

(22) Filed: Apr. 12, 2012

(65) Prior Publication Data

US 2012/0289615 A1 Nov. 15, 2012

Related U.S. Application Data

(62) Division of application No. 12/750,451, filed on Mar. 30, 2010, now Pat. No. 8,178,589, which is a division of application No. 10/552,234, filed as application No. PCT/JP2004/005013 on Apr. 7, 2004, now abandoned.

(30) Foreign Application Priority Data

Apr. 7, 2003 (JP) ................. 2003-103176

(51) Int. Cl.
C07C 27/00 (2006.01)
(52) U.S. Cl.
USPC .......................... 518/717; 518/715
(58) Field of Classification Search
USPC ................................. 518/715, 717
See application file for complete search history.

(56) References Cited

U.S. PATENT DOCUMENTS

| | | | |
|---|---|---|---|
| 3,969,274 | A | 7/1976 | Frampton |
| 4,154,751 | A | 5/1979 | McVicker et al. |
| 4,544,674 | A | 10/1985 | Fiato et al. |
| 5,073,661 | A | 12/1991 | Scheffer et al. |
| 5,604,170 | A | 2/1997 | Sano et al. |
| 6,191,066 | B1 | 2/2001 | Singleton |
| 6,271,432 | B2 | 8/2001 | Singleton |
| 2001/0003787 | A1 | 6/2001 | Singleton |
| 2002/0065378 | A1 | 5/2002 | Luo et al. |

FOREIGN PATENT DOCUMENTS

| | | |
|---|---|---|
| AU | 2004224536 | 7/2009 |
| EP | 0428223 | 11/1990 |
| EP | 0500176 | 2/1992 |
| EP | 0533227 | 3/1993 |
| JP | H05-208141 | 8/1993 |
| JP | 3204507 | 6/2001 |
| JP | 3313389 | 5/2002 |
| WO | WO-99/61550 | 12/1999 |
| WO | WO-2004/085055 | 10/2004 |
| WO | WO-2004089540 | 10/2004 |

OTHER PUBLICATIONS

Office Action dated Dec. 16, 2008 for Japanese patent application No. 2004-113383.
Blekkan, Edd Anders et al., "Alkali Promotion of Alumina-Supported Cobalt Fischer-Tropsch Catalysts Studied by TPR, TOD and Pulse Chemisorption", Acta Chemia Scandinavica 47 (1993) pp. 275-280.
Chen, Jiangang et al., "Influence of Silica Sources on Performance of Co/SiO2 Catalyst for FT Synthesis", vol. 21, (2000), pp. 169-171.
Matsuzaki, T. et al., "Hydrogenation of Carbon Monoxide Over Highly Dispersed Cobalt Catalyst Derived from Cobalt(II) Acetate", Catalysis Today 28 (1996), 251-259.
Oukaci, Racid, et al., "Comparison of Patent Co F-T Catalyst Using Fixed-Bed and Slurry Bubble Column Reactors", Applied Catalysis 186 (1999), 129-144.
Office Action dated Nov. 29, 2007 for U.S. Appl. No. 10/552,234.
Office Action dated Jan. 12, 2009 for U.S. Appl. No. 10/552,234.
Office Action Dated Jun. 22, 2009 for U.S. Appl. No. 10/552,234.
Translation of the International Preliminary Report for PCT International Application No. PCT/JP2004/005013 filed Apr. 7, 2004.
International Search Report dated Apr. 7, 2004 for International Application No. PCT/JP2004/005013.

*Primary Examiner* — Jafar Parsa
(74) *Attorney, Agent, or Firm* — Dorsey & Whitney LLP

(57) ABSTRACT

An exemplary method for producing a catalyst is provided where the catalyst includes a catalyst support on which a metallic compound is loaded. An impurity content of the catalyst can be in a range of approximately 0.01 mass % to 0.15 mass %. In particular, the exemplary method can include pre-treating the catalyst support to lower an impurity concentration of the catalyst support, and loading the metallic compound on the catalyst support after the pretreatment procedure.

7 Claims, 1 Drawing Sheet

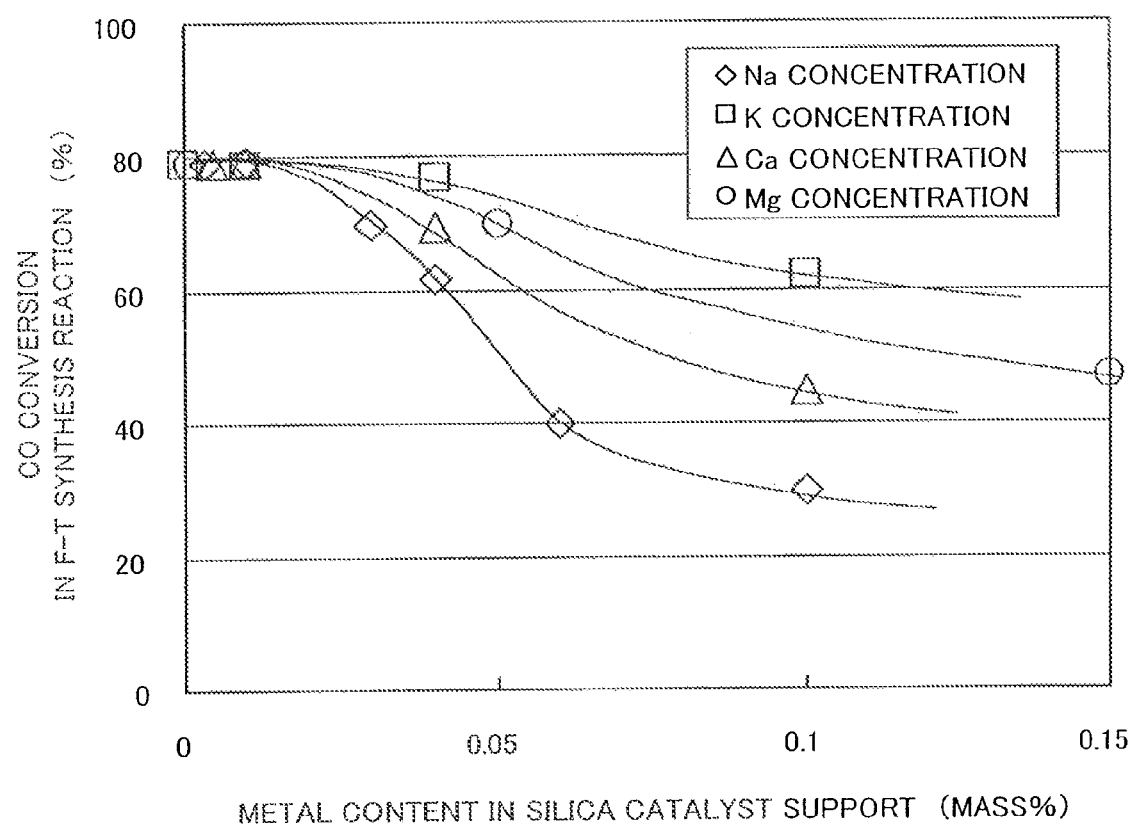

CATALYST FOR PRODUCING HYDROCARBON FROM SYNGAS AND PRODUCING METHOD OF CATALYST

CROSS REFERENCE TO RELATED APPLICATION(S)

This application is a divisional of U.S. application Ser. No. 12/750,451 filed on Mar. 30, 2010 now U.S. Pat. No. 8,178,589, which is a divisional of U.S. application Ser. No. 10/552,234 filed on Oct. 7, 2005 now abandoned, which is a national stage application of PCT Application No. PCT/JP2004/005013 which was filed on Apr. 7, 2004 and published on Oct. 21, 2004 as International Publication No. WO 2004/089540 (the "International Application"). This application claims priority from the U.S. Applications pursuant to 35 U.S.C. §121, and the International Application pursuant to 35 U.S.C. §365, the entire disclosures of which are incorporated herein by reference. The present application also claims priority under 35 U.S.C. §119 from Japanese Patent Application No. 2003-103176 filed on Apr. 7, 2003, the entire disclosure of which is incorporated herein by reference.

FIELD OF THE INVENTION

The present invention relates to a catalyst for producing hydrocarbon from a syngas, which is suitable for a hydrogenation of carbon monoxide and a hydrocarbon production from carbon monoxide, a method for producing the catalyst, and a method for producing a hydrocarbon using the catalyst.

BACKGROUND INFORMATION

Recently, due to emerging environmental issues such as a global warming, a natural gas is becoming highly regarded in that the natural gas exhibits a higher hydrogen/carbon ratio as compared to other hydrocarbon fuels, a coal or the like. Therefore, natural gas can abate emissions of carbon-dioxide being an causative agent of the global warming, and the natural gas has abundant reserves. This, the demand for the natural gas is expected to increase in the future. Under such circumstances, there are a number of small and middle gas fields found in the regions of Southeast Asia, Oceania, etc., which however are still left undeveloped due to their locations of distant places having no infrastructure such as a pipeline and an LNG plant. This may require a significant amount of investment for the infrastructure being incomparable to their minable reserves, so that their developments have been desired to be processed. As one effective development effort, researches and developments for a technology, in which the natural gas is converted into a syngas and then the syngas is converted into a liquid hydrocarbon fuel (such as kerosene and gas oil having excellent transportability and handling characteristics by making use of a Fischer-Tropsch synthesis reaction), are promoted aggressively in various places.

This Fischer-Tropsch synthesis reaction converting the syngas into hydrocarbon with a catalyst is an exothermic reaction, where it is important to effectively remove reaction heat for a stable operation of the plant. As time-proven reaction processes, there are gas-phase synthesis processes (in a fixed bed, entrained bed, or fluid bed) and a liquid-phase synthesis process (in a slurry bed) having respective features. Recently, the liquid-phase synthesis process carried out in the slurry bed is more visible, and is being researched and developed strenuously for the reason that it exhibits a higher heat removing efficiency but avoids the accumulation of generated high-boiling point hydrocarbon on the catalyst as well as a reactor tube plugging caused thereby.

Generally, a higher catalytic activity is preferable, and especially, in the case of the slurry bed. There is a constraint that the concentration of slurry may be needed to be a prescribed value or below so as to keep a favorable slurry state, so that the increase in the catalytic activity is an important factor to increase a process design flexibility. The reported catalytic activities of various types of catalysts for the Fischer-Tropsch synthesis are approximately 1 (kg-hydrocarbon/kg-catalyst·hour) at most in view of the production rate of liquid hydrocarbon of a carbon number of five or above, which cannot be said always enough from the above-described viewpoints, as described in R. Oukaci et al., "Applied Catalysis A", General, 186 (1999), p. 129-144, the entire disclosure of which is incorporated herein by reference.

As a method for improving the catalytic activity, a reduction in sodium content in silica used as a catalyst support has been described as being is effective—described in J. Chen et al., Cuihua Xuebao, Vol. 21 (2000), p. 169-171, the entire disclosure of which is incorporated herein by reference. However, the comparison was made only between the silica of the sodium content below 0.01 mass % and that of the sodium content of approximately 0.3 mass %, and there is no specific description as to the highest sodium content level started to be effected.

Further, generally, the particle diameter of the catalyst for the Fischer-Tropsch synthesis reaction is preferably provided as small as practically as possible from the aspect of reducing a possibility in which the diffusions of heat and matters come to a rate-determining level. However, in the case of the Fischer-Tropsch synthesis reaction in the slurry bed, out of the generated hydrocarbon, the high-boiling point hydrocarbon is accumulated in the reactor, inevitably requiring a solid-liquid separating operation for separating a product from the catalyst, so that there may be another problem that the catalyst of a too small particle diameter reduces the efficiency of the separating operation. Therefore, for the catalyst for the slurry bed, there should be an optimum particle diameter range, and generally, the range from about 20 μm to about 250 μm, or about 40 μm to about 150 μm as an average particle diameter, is considered to be desirable. However, as discussed below, there may be a case where the catalyst is caused to be fractured and pulverized to have a smaller particle diameter in the course of the reaction, requiring a caution.

In particular, in the Fischer-Tropsch synthesis reaction in the slurry bed, the operation can be frequently performed at an extremely high material-gas superficial velocity ($>0.1$ m/second), so that the catalyst particles clash furiously with each other during the reaction to possibly reduce their particle diameters during the reaction when the physical strength and abrasion resistance (resistance to be pulverized) are insufficient. This may at times cause an inconvenience in the separating operation. Further, in the Fischer-Tropsch synthesis reaction, volumes of water can be generated as a by-product. However, in the case of using the catalyst with low water resistance, which deteriorates in strength to be fractured and pulverized with ease due to water, the particle diameter of the catalyst is possibly reduced into a fine powder during the reaction, causing sometimes the inconvenience in the separating operation in the same manner as above.

As described above, the current catalytic activity may not yet be sufficient, and the catalyst with a higher catalytic activity has been requested as a pressing need, also from a viewpoint of extending the design flexibility in the plant.

Furthermore, generally, the catalyst for the slurry bed can be frequently put into practical use there by being prepared through a size control procedure by way of a grinding to have an appropriate particle diameter as described above. However, such a catalyst of a ground type may frequently have a crack or sharp protrusion arisen originally, and can effectuate a lesser mechanical strength and abrasion resistance. Thus, there may be a problem that the catalyst is forced to fracture to generate fine powders, and it becomes difficult to separate the generated high-boiling point hydrocarbon from the catalyst when used in the Fischer-Tropsch synthesis reaction in the slurry bed. Similarly, it is known that a relatively highly-active catalyst can be obtained when a porous silica is used as the catalyst support for the Fischer-Tropsch synthesis reaction. However, the size control based on the grinding may also lead to the strength deterioration due to the previously-described reason. In addition, the silica has lesser water resistance, and is frequently fractured into powders when water exists, thus causing problems especially in the case of the slurry bed.

SUMMARY OF THE INVENTION

One of the objects of the present invention is to provide a catalyst for a Fischer-Tropsch synthesis, which brings a solution to the above-described problems and exhibits a high activity without deteriorating its catalytic strength and abrasion resistance; a producing method of the catalyst, and a producing method of hydrocarbon using the catalyst.

Exemplary embodiments of the present invention relates to a catalyst for a Fischer-Tropsch synthesis exhibiting a high strength and activity, a method for producing the catalyst, and a method for producing hydrocarbon using the catalyst. Additional details therefor are provided below.

For example, a catalyst for producing hydrocarbon from a syngas, according to an exemplary embodiment of the present invention, including a catalyst support on which a metallic compound is loaded, in which an impurity content of the catalyst is in a range from 0.01 mass % to 0.15 mass %. An alkali metal or an alkaline-earth metal content in the catalyst support can be in a range from 0.01 mass % to 0.1 mass %. The catalyst support can satisfy a pore diameter in a range from 8 nm to 50 nm, a surface area in a range from 80 $m^2$/g to 550 $m^2$/g and a pore volume in a range from 0.5 mL/g to 2.0 mL/g, simultaneously. Further, the catalyst support in use allows the catalyst have a fractured or pulverized ratio of 10% or below when an ultrasonic wave is emitted for four hours at a room temperature to the catalyst dispersed in water. In addition, the catalyst support may be silica of a spherical shape. The metallic compound may contain iron, cobalt, nickel and/or ruthenium. This metallic compound can be made from a precursor of metallic compound of the alkali metal or alkaline-earth metal content of 5 mass % or lower.

According to another exemplary embodiment of the present invention, a method for producing the catalyst described above can be provided, in which the metallic compound is loaded on a catalyst support after a pretreatment to lower an impurity concentration of the catalyst support is performed to the catalyst support. The pretreatment may include rinsing using at least one of acid and an ion-exchanged water. The catalyst can be prepared using a catalyst support obtained using rinsing water of an alkali metal or alkaline-earth metal content of 0.06 mass % or lower in the production step of the catalyst support. The catalyst support (e.g., silica) may have a spherical shape shaped by a spraying method.

According to yet another exemplary embodiment of the present invention, a method for producing hydrocarbon is provided, in which the hydrocarbon is produced from a syngas using the catalyst described herein above.

According to the exemplary embodiments of the present invention, it is possible to produce a catalyst for a Fischer-Tropsch synthesis with extremely high activity without deteriorating strength and abrasion resistance of the catalyst, and to perform a Fischer-Tropsch synthesis reaction exhibiting a high hydrocarbon production rate backed by the catalyst.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying FIGURE showing illustrative embodiments, results and/or features of the exemplary embodiment(s) of the present invention, in which:

FIG. 1 is a graph showing a relation between metal contents in a catalyst support of silica and a CO conversion.

DETAILED DESCRIPTION OF THE PREFERRED EMBODIMENTS

Based on a review of impurities contained in a catalyst, it has been determined that a substantial increase in catalytic activity is possible by reducing the impurities, and that a catalyst with high strength and abrasive resistance can be produced without deteriorating the activity with the use of a specific catalyst support, to finally attain the present invention.

A catalyst according to an exemplary embodiment of the present invention is not specifically limited to some one as long as the catalyst contains metal having an activity for a Fischer-Tropsch synthesis reaction, and those catalysts containing iron, cobalt, nickel, ruthenium and the like are acceptable, and as for a catalyst support, preferably, a selection is made from porous oxides or the like made of silica, alumina, titania and the like appropriately to use the selection for the catalyst support. For the preparation method of the catalyst, a common impregnation method, an incipient wetness method, a precipitation method, an ion-exchange method and the like can be employed. It may be difficult to define a loading amount in that the amount changes depending on respective metallic compounds in use, however, a range between a minimum amount exhibiting the activity or above and a loading amount, which causes a contribution efficiency reduction in a reaction due to a sharp drop in the dispersion of the metallic compound on a catalyst support, or below is acceptable. For example, when the cobalt is in use, the amount is in the range from 5 mass % to 50 mass %, and, preferably, from 10 mass % to 40 mass %. In the case of the amount below the range, enough activity may not be obtained, and in the case of the amount above the range, the dispersion drops to a lower utilization efficiency of the cobalt loaded on the catalyst support uneconomically.

After a precursor of metallic compound is loaded on a catalyst support, calcination and/or reduction can be performed as appropriate, so that a catalyst for the Fischer-Tropsch synthesis may be obtained.

Further, it has been determined that the reduction of impurities, which is other than the metallic compound and an element composing the catalyst support, in the catalyst to control the impurities to be within a certain range has a great effect to improve the activity. For example, in the case of employing the silica as a catalyst support, in general, the silica frequently contains an alkali metal such as Na, an alkaline-earth metal such as Ca and Mg, and Fe, Al, and the like, as the impurities. The effect of these impurities may be reviewed in detail using the cobalt as a metallic compound, and it has been determined that a large amount of the alkali metal and/or alkaline-earth metal causes a large activity reduction in the Fischer-Tropsch synthesis reaction. Among those, it is found together that the strongest effect can be seen when sodium is contained.

In order to cause a desirable catalytic activity, the amount of impurities in the catalyst should be curbed to 0.15 mass % or below. If the impurity amount is above the range, the activity decreases largely, being extremely disadvantage. However, an excessive reduction of the impurities leads to diseconomy, so that a preferable impurity amount in the catalyst is 0.01 mass % or above. It is difficult to limit the impurity amount in the precursor of metallic compound, since it depends on the loading amount and the type of precursor. However, in order to reduce the impurity amount in the catalyst, it can be effective to curb the impurity amount in the precursor of metallic compound, especially, the alkali metal content or the alkaline-earth metal content to 5 mass % or lower.

In addition, it has been determined that, out of the impurities of the catalyst, the elements causing the most negative impact with respect to the activity of the catalyst are the alkali metal and the alkaline-earth metal. Hence, a relation between the concentrations of these metals in a catalyst support of silica and a CO conversion used in a Fischer-Tropsch synthesis reaction, which becomes an indicator of the activity of the catalyst, has been reviewed, and the result of such review is shown in FIG. 1. As shown in FIG. 1, when the contents of these metals are in the range of 0.01 mass % or lower, the alkali metal and the alkaline-earth metal affect to a small degree, however, when they are in the range over the 0.01 mass % the activity lowers gradually. As a result of the above-described review, the alkali metal content or the alkaline-earth metal content in the catalyst support are preferably 0.1 mass % or lower, and more preferably, they are 0.07 mass % or lower, and most preferably, they are 0.04 mass % or lower. When the impurity content in the catalyst support comes to 0.15 mass % or higher, the activity of the catalyst falls largely. Also here, in the same manner as above, an excessive reduction of the alkali metal content and alkali-earth metal content in the catalyst support leads to diseconomy, the alkali metal and alkali-earth metal may exist in the catalyst to the extent of their contents not affecting adversely the catalytic activity. As described above, when the alkali metal content and alkaline-earth metal content in the catalyst support are reduced to 0.01 mass % or lower, enough effect can be obtained, so that the alkali metal content and alkaline-earth metal content are preferably 0.01 mass % or higher from a cost performance viewpoint.

In the case of the catalyst support which can be produced without impurity contamination in the production process backed by a devisal, it is preferable to take such a devisal of excluding the impurities in the production process.

For example, generally, a large quantity of rinsing water is used when producing a catalyst support of silica, however, when rinsing water containing impurities such as industrial water is used, a large amount of impurities remains in the catalyst support, causing the catalytic activity to fall largely, being unfavorable. However, with the use of rinsing water of low impurity content or no impurity, a favorable catalyst support of silica of a lesser impurity content can be obtained. In this case, the alkali metal content or the alkaline-earth metal content in the rinsing water is favorably 0.06 mass % or lower, and the content above 0.06 mass % leads to the increase in the impurity content in the catalyst support of silica, which causes a substantial reduction in the catalytic activity after the preparation, being unfavorable. Ideally, the use of ion-exchanged water is favorable, in which the ion-exchanged water may be obtained by a production using an ion-exchange resin or the like, however, it may be obtained by a production through an ion exchange using a silica gel, for example, when employing a silica as the catalyst support, since the silica gel is generated in the silica production line as a substandard article. The silica can capture the impurities in the rinsing water due to an ion exchange between hydrogen in a silanol on the surface of the silica and an impurity ion. Accordingly, even if it is the rinsing water containing impurities to a small extent, a capture of the impurities can be prevented to some extent by adjusting pH of the rinsing water to lower. Further, an exchanged ion amount (impurity contamination amount) may be in proportion to the amount of the rinsing water used, so that the reduction of the impurities in the silica can be realized by reducing the amount of the rinsing water, in other words, by increasing a usage efficiency of the water to the end of the water rinsing.

When it is possible to reduce the impurities in the catalyst support by performing a pretreatment without largely changing physical and chemical properties of the catalyst support, such a pretreatment is effective for the improvement of the activity of the catalyst. Such pretreatment may appropriately use a water rinsing technique, an acid rinsing technique, an alkalis rinsing technique and the like, and, for example, when rinsing the catalyst support of silica, rinsing with an acid solution such as a nitric acid solution, a hydrochloric acid solution, an acetic acid solution or the like, and rinsing with an ion-exchanged water are effective. After the rinsing with these acids, when a partial acid remaining in the catalyst support comes to be an obstacle, further rinsing with clean water such as ion-exchanged water is effective.

Further, when preparing silica, calcination is frequently performed in an aim to improve particle strength, an activity of a surface-silanol group and the like. However, when the calcination is performed in the state of containing relatively larger impurities, impurity elements are captured into a skeletal structure of the silica. Accordingly, even if rinse of the catalyst support of silica is performed to reduce the impurity content, it may be difficult to make the reduction of the impurity content. Hence, when wishing to reduce the impurity content by rinsing the catalyst support of silica, the use of a silica gel without calcination is preferable.

With the use of the catalyst as described above, it is possible to obtain a catalyst exhibiting an extremely high activity in the Fischer-Tropsch synthesis reaction. In particular, the effect is quite noticeable when using cobalt as a metallic compound and silica as a catalyst support.

In order to keep the metal dispersion higher to thereby improve contribution efficiency to the reaction of the metallic compound loaded, it is preferable to use a catalyst support having a large specific surface area. However, in order to increase the specific surface area, there are needs to decrease a pore diameter and to increase a pore volume, while the increase of these two factors leads to a reduction in the abrasion resistance and strength, being unfavorable. As a result of due diligent efforts, it has been determined that, as a catalyst support being on the objects of the present invention, that satisfying together a pore diameter in the range from 8 nm to 50 nm, a specific surface area in the range from 80 $m^2$/g to 550 $m^2$/g, and a pore volume in the range from 0.5 mL/g to 2.0 mL/g, as physical properties thereof, is preferable. It is also preferable to have together the pore diameter in the range from 8 nm to 30 nm, the specific surface area in the range from 150 m$^2$/g to 450 m$^2$/g, and the pore volume in the range from 0.6 mL/g to 1.5 mL/g. It is further preferable to have together the pore diameter in the range from 8 nm to 20 nm, the specific surface area in the range from 200 m$^2$/g to 400 m$^2$/g, and the pore volume in the range from 0.8 mL/g to 1.2 mL/g.

In order to obtain a catalyst exhibiting enough activity in the Fischer-Tropsch synthesis reaction, the specific surface area should be 80 m$^2$/g or more. under this specific surface area, the dispersion of the loaded metallic compound decreases to lower the contribution efficiency to the reaction of the metallic compound, which can be unfavorable. Above the specific surface area of 550 m$^2$/g, it may be difficult to have the pore volume and the pore diameter satisfy the previously-described ranges together, which can be also unfavorable.

It is possible to increase the specific surface area as the pore diameter is decreased. However, when the pore diameter is below 8 nm, a large amount of light hydrocarbon such as methane, which can be a by-product in the Fischer-Tropsch synthesis reaction, is generated in that the hydrogen and the carbon monoxide have different gaseous diffusion rates in the pore, and, as a result, the hydrogen has a higher partial pressure in the inner portion of the pore, which can be unfavorable. In addition, the diffusion rate of the generated hydrocarbon in the pore decreases and, as a result, a superficial reaction rate is caused to become lower as well, which is also unfavorable. Further, above the pore diameter of 50 nm, it may be difficult to increase the specific surface area, so that the dispersion of the metallic compound decreases, which is further unfavorable.

Preferably, the pore volume is in the range from 0.5 mL/g to 2.0 mL/g. Under 0.5 mL/g, it can become difficult to satisfy the pore diameter and the specific surface area in the above-described ranges together; and above 2.0 mL/g, the strength deteriorates substantially, which is unfavorable.

As described above, the catalyst for the Fischer-Tropsch synthesis, which is for the slurry bed, requires the abrasion resistance and strength. Further, in the Fischer-Tropsch synthesis reaction, a large amount of water is generated as a by-product, so that the use of a catalyst which is fractured into powders under the existence of water causes an inconvenience as described herein above, thus requiring caution. Accordingly, it is preferable to use a catalyst support having a spherical shape rather than a catalyst support of a shattered structure potentially having cracks at high probability in which a sharp angle thereof tends to suffer a damage and removal. When producing the spherical catalyst support, a granulation or spraying method is applicable, and particularly, when producing a spherical catalyst support of silica having a particle diameter of approximately 20 μm to 250 μm, the spraying method is appropriate, by which the spherical catalyst support of silica exhibiting excellent abrasion resistance and water resistance can be obtained.

A method for producing such a catalyst support of silica in accordance with another exemplary embodiment of the present invention is described below. A silica sol is generated by mixing an alkali metal silicate solution and an acid solution under the condition from pH 2 to pH 10.5; the silica sol is sprayed into a gas medium or an organic solvent which the sol is insoluble, so that the sol becomes to a gel; and the silica gel goes through an acid treatment, a water rinsing treatment, and a dry treatment. Here, as an alkali metal silicate solution, a sodium silicate solution is desirable, in which, preferably, the mole ratio of $Na_2O:SiO_2$ is 1:1 to 1:5, and the concentration of silica is 5 mass % to 30 mass %. As an acid to be used, a nitric acid, a hydrochloric acid, a sulfuric acid, an organic acid, or the like is applicable, whereas, the sulfuric acid is preferable because the sulfuric acid is not corrosive to a container used in the production process and leaves no organic matter behind. The concentration of the acid is, preferably, in the range from 1 mol/L to 10 mol/L. Under the range, the progress of the gelation slows significantly, and above the range, the gelation progresses too fast to be difficult to be controlled so that a desired physical property value is difficult to be obtained, being unfavorable. Further, when adopting the method of spraying into the organic solvent, as an organic solvent, kerosene, paraffin, xylene, toluene or the like can be employed.

The spherical catalyst support obtainable by the above-described producing method barely deteriorates by the crash between the catalysts, by the fracture due to water, and by the pulverization. There are various quantification methods for the fracture and pulverization, out of which the present inventors employed an abrasion resistance test to perform an evaluation, in which an ultrasonic wave is emitted at a temperature in the range from a room temperature to 400° C. while dispersing the catalyst into water. As an ultrasonic generator, that of 47 kHz in frequency and 125 W in output power (manufacture: Branson Ultrasonics Corp., product name: BRANSONIC Model 2210J) is used, and 1 g of catalyst not containing particles below 20 μm is dispersed into 3 mL of pure water, the ultrasonic is emitted at a room temperature for, e.g., four hours, and mass % of the particles below 20 μm in the entire sample is defined as a fractured or pulverized ratio. In this evaluation based on such method, when the fractured or pulverized ratio is 10 mass % or below, an actual use in the slurry bed generally causes no problem in view of the separation of generated high-boiling point hydrocarbon from the catalyst. In the case of a catalyst showing the fractured or pulverized ratio over the 10 mass %, the separation efficiency largely drops, which is generally unfavorable.

With the use of the composition, structure and producing method as described above, a catalyst for a Fischer-Tropsch synthesis, which exhibits higher activity without deteriorating strength and abrasion resistance of the catalyst, can be obtained.

Further, with the use of the catalyst for the Fischer-Tropsch synthesis according to the present invention, producing a product is enabled by the Fischer-Tropsch synthesis reaction with higher efficiency and lower costs. Specifically, when the Fischer-Tropsch synthesis reaction can be carried out using the catalyst obtainable by the exemplary embodiments of the present invention, a selectivity of a liquid product having a carbon number of five or above as a main product is high, and the production rate of the liquid product per a catalyst unit mass (production rate of hydrocarbon) is extremely high. Furthermore, the catalyst is barely pulverized and catalyst activity decrease is very small when it is in use, so that the catalyst has a longer catalytic life, as a feature. With these features, the Fischer-Tropsch synthesis reaction can be carried out with higher efficiency at lower costs.

Non-Limiting Examples

Using an autoclave of an internal volume of 300 mL, 2 g of Co/SiO$_2$ catalyst (catalyst support of silica is manufactured by Fuji Silysia Chemical Ltd. and of a spherical shape having an average particle diameter of 100 μm, and Co loading amount is from 16 mass % to 30 mass %) and 50 mL of n-C$_{16}$ (n-hexadecane) were charged there into, and after that a Fischer-Tropsch synthesis reaction was carried out under conditions of 230° C. and 2.0 MPa-G while stirring an agitator at 800 rpm by introducing a syngas (H$_2$/CO=2) at a flow rate of W (catalyst mass)/F (syngas flow velocity)=5 (g·h/mol)

except as otherwise specifically provided. A CO conversion, a $CH_4$ selectivity and a $CO_2$ selectivity can be calculated by the formulas shown below.

$$CO \cdot conversion \cdot (\%) = \frac{\left(\begin{array}{c}Supplied \cdot CO\\amount \cdot (mol)\end{array}\right) - \left(\begin{array}{c}CO \cdot amount \cdot in \cdot gas\\at \cdot reactor \cdot outlet \cdot (mol)\end{array}\right)}{Supplied \cdot CO \cdot amount \cdot (mol)} \times 100$$

$$CH_4 \cdot selectivity \cdot (\%) = \frac{generated \cdot CH_4 \cdot amount \cdot (mol)}{reacted \cdot CO \cdot amount \cdot (mol)} \times 100$$

$$CO_2 \cdot selectivity \cdot (\%) = \frac{generated \cdot CO_2 \cdot amount \cdot (mol)}{reacted \cdot CO \cdot amount \cdot (mol)} \times 100$$

Hereinafter, an exemplary effect of the exemplary embodiments of the present invention are described based on the review of the results of examples and a comparison example.

EXAMPLE 1

A 20 mass % of Co was loaded on a catalyst support of silica having characteristics as shown in column A in Table 1 provided below and a Fischer-Tropsch synthesis reaction was carried out. As a result, the CO conversion was 75.9%, $CH_4$ selectivity was 5.3% and $CO_2$ selectivity was 1.4%.

EXAMPLE 2

A 20 mass % of Co was loaded on a catalyst support of silica having characteristics as shown in column B in Table 1 provided below and a Fischer-Tropsch synthesis reaction was carried out. As a result, the CO conversion was 75.8%, $CH_4$ selectivity was 4.6% and $CO_2$ selectivity was 1.0%.

EXAMPLE 3

A catalyst support of silica having characteristics as shown in column G in Table 1 provided below was rinsed with a hydrochloric acid solution and an ion-exchanged water to obtain a catalyst support of silica as shown in column C in Table 1. A 20 mass % of Co was loaded on the catalyst support of silica and a Fischer-Tropsch synthesis reaction was carried out and, as a result, the CO conversion was 74.1%, $CH_4$ selectivity was 4.8% and $CO_2$ selectivity was 1.0%. Further, an abrasion resistance test emitting a supersonic wave at the room temperature described before was carried out, and the fractured or pulverized rate was measured as a result, the mass ratio of particles of 20 μm or below was 0.00%. Still further, the catalyst which had been subjected to the reaction for 1000 hours was collected, and a measurement was made for a particle size distribution. As a result, the mass ratio of particles of 20 μM or below was 0.00%.

EXAMPLE 4

A 20 mass % of Co was loaded on a catalyst support of silica of a pore diameter of 30 nm as shown in column D in Table 1 provided below and a Fischer-Tropsch synthesis reaction was carried out. As a result, the CO conversion was 46.4%, $CH_4$ selectivity was 7.8% and $CO_2$ selectivity was 1.0%.

EXAMPLE 5

The same reaction as in the Example 3 was carried out only by letting a 30 mass % of Co to be loaded on the support and letting W/F to be 1.5 (g·h/mol). As a result, the CO conversion was 74.7%, $CH_4$ selectivity was 3.7% and $CO_2$ selectivity was 0.6%, and the production rate of the hydrocarbon having a carbon number of 5 or above was 2.1 (kg–hydrocarbon/kg–catalyst·hour).

EXAMPLE 6

A 30 mass % of Co was loaded on a catalyst support of silica having physical properties as shown in column E in Table 1 provided below and a Fischer-Tropsch synthesis reaction was carried out by setting the W/F to be 1.5. As a result, the CO conversion was 71.7%, $CH_4$ selectivity was 4.4% and $CO_2$ selectivity was 0.7%, and the production rate of the hydrocarbon having a carbon number of 5 or above was 1.9 (kg–hydrocarbon/kg–catalyst·hour).

EXAMPLE 7

A 16 mass % of Co was loaded on a catalyst support of silica having physical properties as shown in column F in Table 1 provided below and a Fischer-Tropsch synthesis reaction was carried out by setting the W/F to be 2. As a result, the CO conversion was 74.8%, $CH_4$ selectivity was 4.9% and $CO_2$ selectivity was 1.1%, and the production rate of the hydrocarbon having a carbon number of 5 or above was 1.4 (kg–hydrocarbon/kg–catalyst·hour)

COMPARISON EXAMPLE 1

A 20 mass % of Co was loaded on a catalyst support of silica having a large amount of impurities as shown in column G in Table 1 provided below and a Fischer-Tropsch synthesis reaction was carried out. As a result, the CO conversion was 24.0%, $CH_4$ selectivity was 8.3% and $CO_2$ selectivity was 0.84%.

INDUSTRIAL APPLICABILITY

As has been described above, according to the exemplary embodiments of the present invention, a catalyst for a Fischer-Tropsch synthesis, which exhibits an extremely high activity, can be produced without deteriorating strength and abrasion resistance of the catalyst, and a Fischer-Tropsch synthesis reaction exhibiting a higher hydrocarbon production rate can be carried out with the catalyst.

TABLE 1

| marker | A | B | C | D | E | F | G |
|---|---|---|---|---|---|---|---|
| Pore diameter (nm) | 10 | 10 | 10 | 30 | 10 | 8 | 10 |
| Surface area (m²/g) | 250 | 235 | 330 | 110 | 346 | 430 | 341 |
| Pore volume (ml/g) | 0.81 | 0.81 | 1.13 | 1.00 | 1.16 | 0.82 | 1.20 |
| Na concentration in support (wt ppm) | 120 | 105 | 110 | 180 | 176 | 316 | 1480 |
| Ca concentration in support (wt ppm) | 75 | 32 | 51 | 110 | 111 | 187 | 41 |
| Mg concentration in support (wt ppm) | 13 | 8 | 10 | 15 | 16 | 27 | 22 |
| Fe concentration in support (wt p.m) | 25 | 20 | 13 | 20 | 29 | 33 | 15 |
| Al concentration in support (wt ppm) | 94 | 62 | 42 | 34 | 92 | 103 | 50 |

What is claimed is:

1. A method for producing hydrocarbon, comprising:
generating the hydrocarbon from a syngas using a catalyst, the catalyst including a silica catalyst support, a Na content of the silica catalyst support being between about 0.0 mass % and about 0.04 mass %, the catalyst support being prepared using a wash of at least one of an ion-exchanged water, a water having low impurities or a water absent impurities;
wherein the catalyst includes an active metal, which is the least one selected from a group consisting of: cobalt, iron, nickel, or ruthenium;
wherein the wash is performed absent a prior calcination of the silica; and
wherein an impurity content of the catalyst is in a range of approximately 0.01 mass % to 0.15 mass %.

2. The method of claim 1, wherein the impurity content of the catalyst is in a range of approximately 0.01 mass % to 0.07 mass %.

3. The method of claim 1, wherein the impurity content of the catalyst is in a range of approximately 0.01 mass % to 0.04 mass %.

4. The method of claim 1, wherein the hydrocarbon is generated in a slurry bed.

5. The method of claim 1, wherein the catalyst support comprises a spherical catalyst support on which cobalt is loaded, wherein a diameter of the spherical catalyst is in a range of approximately 20 μm to 250 μm.

6. A method for producing hydrocarbon, comprising:
generating the hydrocarbon from a syngas using a catalyst, the catalyst including a silica catalyst support, a Na content of the silica catalyst support being between about 0.0 mass % and about 0.04 mass %, the catalyst support being prepared using a wash of at least one of an ion-exchanged water, a water having low impurities or a water absent impurities;
wherein the wash is performed absent a prior calcination of the silica; and
wherein an impurity content of the catalyst is in a range of approximately 0.01 mass % to 0.15 mass %.

7. The method of claim 6, wherein the catalyst includes an active metal, which is at least one of cobalt, iron, nickel, or ruthenium.

* * * * *